UNITED STATES PATENT OFFICE.

RUFUS HUGH SCOTT, OF CENTRALIA, ILLINOIS.

CATARRH REMEDY.

SPECIFICATION forming part of Letters Patent No. 309,655, dated December 23, 1884.

Application filed May 27, 1884. (No specimens.)

*To all whom it may concern:*

Be it known that I, RUFUS HUGH SCOTT, of Centralia, in the county of Marion and State of Illinois, have invented a new and Improved Composition of Matter to be Used for the Treatment of Catarrh, of which the following is a full, clear, and exact description.

My composition consists of the following ingredients, combined in the proportions stated, viz: chloroform, one ounce; camphor, four ounces; chloral hydrate, one ounce; glycerine, eight ounces; carbolic acid, (one per cent. solution,) two and one-half drams.

In preparing this composition the chloroform, camphor, and chloral hydrate are thoroughly mixed, and also the glycerine and carbolic acid. The two mixtures are then united and the composition is thoroughly shaken. The vessel containing the composition should be kept tightly closed.

In applying the composition a sufficient quantity of cotton to effectually plug the nostril is taken, which is opened, and eight or ten drops of the composition is placed within it. The cotton is then closed and inserted in the nostril. The cotton should be removed, the nostril cleansed, and the application renewed every eight or ten hours, till a cure is effected, which in mild cases will generally be in from three to ten days; but in chronic cases a longer time will be required. The other nostril is then treated in the same manner.

In this composition the chloroform and camphor act as soothing stimulants to the affected parts. The chloral hydrate, aided by the chloroform, penetrates to the diseased parts, and, being of a healing nature, assists in the curative effects of the other ingredients. The glycerine acts as a healing agent, protects the mucous membrane from the vesicating effect of the chloroform, chloral hydrate, and carbolic acid, and also prevents the too rapid diffusing of the other ingredients. The carbolic acid, by its antiseptic action, destroys the diseased or septic matter with the diseased parts.

The composition, from its volatile nature, penetrates every ramification of the diseased parts, and thus effects a radical cure.

Having thus described my invention, what I claim as new, and desire to secure by Letters Patent, is—

The herein-described composition of matter to be used for the treatment of catarrh, consisting of chloroform, camphor, chloral hydrate, glycerine, and carbolic acid, in substantially the proportions specified.

RUFUS HUGH SCOTT.

Witnesses:
EUG. L. STOKER,
JAS. J. GILES.